(12) United States Patent
Radom et al.

(10) Patent No.: US 8,261,208 B2
(45) Date of Patent: Sep. 4, 2012

(54) METHOD AND SYSTEM SPEEDING UP DATA INPUT TO A COMMUNICATION SYSTEM

(75) Inventors: Benny Radom, Tel Aviv (IL); Ori Zaltzman, Herzelia (IL); Oded Poncz, Kiryat-Ono (IL)

(73) Assignee: Looptv, New York, NY (US)

( * ) Notice: Subject to any disclaimer, the term of this patent is extended or adjusted under 35 U.S.C. 154(b) by 1389 days.

(21) Appl. No.: 10/579,592

(22) PCT Filed: Nov. 22, 2004

(86) PCT No.: PCT/IL2004/001072
§ 371 (c)(1),
(2), (4) Date: May 17, 2006

(87) PCT Pub. No.: WO2005/052719
PCT Pub. Date: Jun. 9, 2005

(65) Prior Publication Data
US 2009/0019395 A1    Jan. 15, 2009

Related U.S. Application Data

(60) Provisional application No. 60/524,802, filed on Nov. 25, 2003.

(51) Int. Cl.
*G06F 3/048* (2006.01)

(52) U.S. Cl. ............................................ 715/816

(58) Field of Classification Search .................. 715/259, 715/260, 261, 816
See application file for complete search history.

(56) References Cited

U.S. PATENT DOCUMENTS

| | | | |
|---|---|---|---|
| 4,374,625 A | 2/1983 | Hanft et al. | |
| 6,327,593 B1 | 12/2001 | Goiffon | |
| 6,377,965 B1 | 4/2002 | Hachamovitch et al. | |
| 6,405,060 B1 | 6/2002 | Schroeder et al. | |
| 6,519,771 B1 | 2/2003 | Zenith | |
| 6,727,927 B1 | 4/2004 | Dempski et al. | |
| 7,159,008 B1 * | 1/2007 | Wies et al. | 709/206 |
| 7,350,145 B2 * | 3/2008 | Wolpe | 715/271 |
| 7,437,410 B2 * | 10/2008 | Danker et al. | 709/204 |
| 2003/0234821 A1 * | 12/2003 | Pugliese | 345/816 |
| 2008/0010659 A1 * | 1/2008 | Zenith | 725/87 |

* cited by examiner

*Primary Examiner* — Thanh Vu
(74) *Attorney, Agent, or Firm* — Smith Risley Tempel Santos LLC; Gregory Scott Smith (57) ABSTRACT

User equipment and/or devices equipped to engage in textual communication sessions also interface to a server. The server maintains a thesaurus bank that includes a variety of different thesauri. When engaging in a textual communication or editing session, the user or the user equipment can request or may automatically receive a relevant thesaurus. As the user enters characters to create a textual entry, the selected thesaurus is searched to identify candidate completions. The user can then select one of several displayed candidate completions. In addition, the user input can also be delivered to the server and used to update the content of the thesauri.

16 Claims, 6 Drawing Sheets

METHOD AND SYSTEM SPEEDING UP DATA INPUT TO A COMMUNICATION SYSTEM

CROSS-REFERENCE TO RELATED APPLICATIONS

This application is filed under 37 U.S.C. 371 based on International Patent Number PCT/IL2004/001072 which claims the benefit of the priority date of U.S. Provisional Application for Patent having a Ser. No. of 60/524,802 and a filing date of Nov. 25, 2003.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to the field of data and, more particularly, to automated word completion systems for composing a text message.

During recent years, communication through the use of text messages has experienced dramatic growth in popularity and use. The advantage of text message communications that has augmented this growth is the availability of quick and easy communication between widely disparate individuals and networks. The communication may be between a pair of friends, relatives or coworkers, and also between strangers and groups of strangers. The text messages may be used also for commercial purposes such as ordering services, voting, etc.

The text communication may be done over the Internet using instant messages and chat rooms, via cellular telephone using Short Message Service (SMS), or via digital TV using interactive television services, etc.

A problem with using text message communication via cellular telephone, interactive TV, palm computers, etc. is that those devices are frequently difficult to use for text entry. Generally, those devices have space-limited keyboards (typically a 0-9 numeric keypad plus several additional function keys). Entering a text message via a space-limited keyboard is often confusing and difficult.

There are several methods that face the challenge of accelerating text communication via cellular or interactive TV. For example, U.S. Pat. No. 6,519,771 discloses a method for creating a message to a chat room over interactive TV. The method offers a limited number of predetermined responses to the television or video content. The predetermined responses are prepared in advance by the user or may be standardized responses that are broadcast to many user interface devices. The user can select the appropriate predetermined message. Having the predetermined responses available allows for interactive communication without the need for a keyboard to type the message.

Another method is disclosed in U.S. patent application Ser. No. 09/987,218 having the publication number US2003/0090518. This application discloses a method for automatically forwarding and replying with a short message. By using this method, a local user can select a message from one of a plurality of pre-established reply messages. The user may modify the selected message or send it as is. Moreover, a structuralized, modularized and hierarchy menu is provided to the local user in order to define a group of pre-established reply messages that may fit the user's needs.

However, the above-described methods offer limited communication because the user is limited to pre-established and/or predetermined reply messages, and the user cannot create his preferred message.

There are some methods for accelerating the entry of text data by offering automatic or assisted word completion, such as the methods that are disclosed in patents numbers U.S. Pat. Nos. 6,405,060, 6,377,965, or 4,374,625. The methods described in these patents can be divided into two groups depending on the type of thesaurus that is used for offering a list of words. The thesaurus that is used in the first group is unique for each user and is created by the user. This thesaurus is updated from time to time according to the usage of the words by the user. This group of methods is limited to the past experience of the user and cannot benefit from the usage and the experience of other users.

The other group of methods uses a thesaurus that is prepared in advance by a third party. This thesaurus may be based on a large number of users and may offer words that were not used by the user himself. However, the thesaurus utilized in these methods is fixed and is not updated from time to time.

Moreover, a common device with a limited-space keyboard may have limited free storage place, since its main application is other than text communication, and a storage location for a large thesaurus is not one of its objectives. For example, a cellular phone is used mainly for audio communication; a digital receiver or a TV set-box usually is used for receiving and processing digital TV signals, etc.

Therefore, there is a need in the art for a new method of accelerating the input of text messages in a device with a space-limited keyboard and limited storage capabilities, a method that may load, upon need, a dynamically and continuously updated thesaurus with the most likelihood words to be tapped by a user during the current application.

SUMMARY OF THE INVENTION

The present invention provides a solution to the above-described needs by providing a word completion method that operates by offering a list of words from which the user may select the appropriate or desired one, if it exists. The list is selected from a thesaurus according to the character that has been tapped or otherwise entered by the user. The list may have a flexible number of words, depending on the frequency of usage of the character that has been tapped. The number of words may be varied from one to a few words, such as, but not limited to, three, five or seven words. The list may contain terms, phrases, slang and alpha-numeric combinations (e.g. '4U'). The thesaurus may also depend upon the topic of the communication. Furthermore, the thesaurus can be dynamically and continuously updated according to the current communication transportation that is created by participants sharing the same topic. The appropriate thesaurus may be loaded to the user's communication device by the service provider upon selecting the topic of the communication or upon joining a chat room.

Usually, a chat room is related to a particular topic, with participants attracted to that chat room by their interest in the topic. Therefore, communication between participants in a chat room or a forum, in the case of interactive TV communication, may frequently share common data terms such as words, terms, abbreviations, expressions and other combinations of alpha-numeric characters and signs. The appearance of those frequently used or popular words may be changed over time, depending on the most popular or the most recent event that is relevant to the topic.

An exemplary embodiment of the present invention may comprise a text message server that may reside in the communication service provider's premises. The text-message server handles the text message communication transportation. The server, in parallel to transferring the text messages to its destination, may store the text messages in appropriate one or more databases. Each database is associated with a topic or chat room or any other type of subject (or group). They may include subjects such as, but not limited to, profession, business, sex, age, etc. It should be noted that the terms "topic", "forum", "subject", "group" and "chat room" are used interchangeably herein. Henceforth, the description of the present invention may use the term 'topic' as a representative term for any of the above group.

In another exemplary embodiment, the database may receive input from additional sources such as, but not limited to, another database that may contain a thesaurus of words that are frequently used in text messages or from another topic that is close to the topic of the database; in some cases, words may be added manually by the service provider, etc.

From time to time, in a continuous mode, a statistical processor may analyze the data in each one of the databases and may define for each database a current thesaurus that fits the topic that is associated with that database. The current thesaurus of a topic may contain the words, which are most frequently used in this topic. A thesaurus may contain words in more than one language, slang, unique terms such as '4U' that is often used instead of 'For You', etc. Then the current thesaurus of a topic is stored in a bank of thesauri, and the statistical processor may process the database of the next topic. The number of words in the current thesaurus of a topic can be a fixed number or can be configured according to the topic. An embodiment of the present invention may have more than one thesaurus per topic. Those thesauri may differ from each other by their size (number of words). The size of each one of them may be defined by the type of equipment that is used by the user.

An exemplary communication device at the user location may have an agent that communicates with the text message server. Upon initiating a text communication session, the agent may automatically define the topic of the session, for example, by the chat room or the destination address, etc. The agent may prompt the user to define the topic of the communication or the chat room that the user would like to join, or the user may define the topic without being prompted. Based on the topic of the session, the agent may load the appropriate thesaurus from the service provider premises. In some embodiments, in which the thesaurus is an integral part of the user's equipment, the agent may update the thesaurus with the latest version, if needed.

The method of transferring the appropriate thesaurus from the server to the equipment of the user may depend on the type of communication network that is used. For example, if the network is the interactive TV network, the bank of updated thesauri is transferred to a broadcast server. The broadcast server may use a carousel transmitting method for broadcasting the plurality of thesauri. The carousel transmitting method is a method for broadcasting a plurality of applications or data in a cyclic mode over a digital TV broadcasting network. The agent may wait for the appropriate thesaurus. Upon receiving the appropriate thesaurus, the agent stores the whole thesaurus or a portion of the thesaurus according to the available storing volume that may be used for this application. The size of the stored thesaurus may be configured according to the device.

In another exemplary embodiment, the agent may communicate with the text message server and request the appropriate thesaurus. The communication may be done over the return channel of the interactive TV, or, for example, in cellular communication it may be done via a cellular data connection. In both cases, the communication may be based on the Internet Protocol (IP) or any other type of protocol that can be used for data communication.

The agent may start following the user's keystrokes. In response to a keystroke, the thesaurus is searched in effort to identify an entry that matches the keystroke. The matched entry in the thesaurus may comprise a list of completion suggestions that may complete the relevant keystroke. If a match entry is found, then the list of completion suggestions is displayed to the user, such as in a pop-up list box, typically under and to the right (or to the left, depending on the writing direction that is utilized in the used language) of the partial data entry. The list may have a flexible number of words, depending on the frequent of usage of the current keystroke. It should be noted that the terms "words"; "terms"; "phrases"; and "completion suggestion" are used interchangeably herein. Henceforth, the description of the present invention may use the term 'word' as a representative term for any of the above group. The number of words may be varied from one to few words, such as, but not limited, to three, five or seven words. The completion suggestions are positioned in the list based on a computed indication of likelihood of being selected. The user may accept one of the suggested completions or may continue entering the data item. Acceptance may be done by touching a pointing device to the display screen over the position of the desired completion suggestion, or by using traditional selection and acceptance keystrokes, such as the "arrow" keys to select a completion suggestion and the "enter" key to accept the selected completion suggestion. The term 'keystroke' represents entering of data or instruction by the user. It can be by carried out, for example, by tapping a key in a keypad or a keyboard or it may be by pointing to a soft key that is displayed on the user's display or via a voice command or any other method of inputting data.

The present invention supports the current needs of the art by disclosing a method that accelerates text and/or data entering. The method uses a statistical thesaurus that is built dynamically and is updated continuously from text collections from a plurality of users communicating on the same topic.

Some embodiments of the present invention can be used during off line operation and/or online operation. A user may download one or more updated thesauri and save them in the user's device. Then the user may add additional words to each thesaurus and use a thesaurus while typing. From time to time the user may update, replace or add a thesaurus, transfer copies of his thesauri to others, etc.

Other objects, features, and advantages of the present invention will become apparent upon reading the following detailed description of the embodiments with the accompanying drawings and appended claims.

DETAILED DESCRIPTION OF EMBODIMENTS OF THE INVENTION

Turning now to the figures in which like numerals represent like elements throughout several views, exemplary embodiments of the present invention are described. For convenience, only some elements of the same group may be labeled with numerals. The purpose of the drawings is to describe exemplary embodiments of the present invention and are not intended to be limiting. Therefore, features shown in the figures are chosen for convenience and clarity of presentation only.

Figure 1:
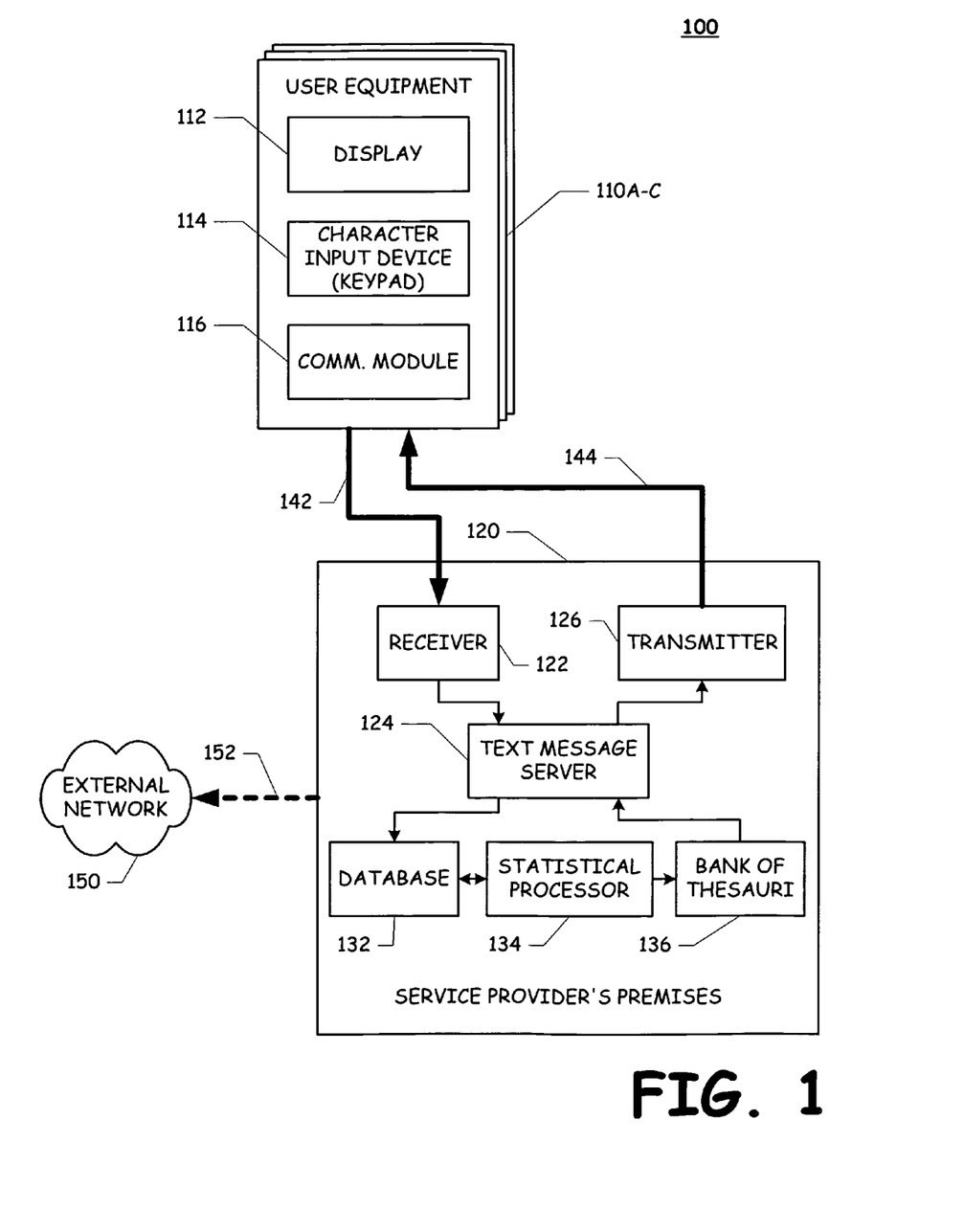
FIG. 1 illustrates a block diagram of a communication system that uses an exemplary embodiment of the present invention for accelerating text entry.

FIG. 1 illustrates a block diagram with the relevant elements of a communication system 100 that uses an exemplary embodiment of the present invention for accelerating text entry. The communication system 100 may comprise service provider premises (SPP) 120, a plurality of user equipment 110a-c, communication channels 142 and 144 between the SPP 120 and the plurality of user equipment 110a-c, external network 150 and a connection 152 between the external network 150 and the SPP 120. The connection 152 may be based on IP protocol, for example, or on any other communication protocol. Three user equipments 110a-c are shown in FIG. 1 by way of example, and any number other than three may be used with the present invention. The external network 150 may be the Internet or some other global or wide area network.

Each example of the user equipment 110a-c may comprise a display 112, an input device 114, and a communication module 116. User equipment 110a-c may have audio capabilities (not shown in the drawings) to communicate with the user, in addition to the display. User equipment 110a-c may be a single device with internal modules or may be a system comprising separated devices. In a case in which the communication system 100 is digital TV equipment (interactive TV), then the display 112 can be the TV screen, the communication module 116 may be a digital TV receiver such as the set-top box, and the input device 114 may be the remote control of the TV receiver. Usually the communication between the remote control 114 and the set-top box 116 is wireless communication. A common wireless method may use Infra Red IR medium, Bluetooth or RF.

Other types of user equipment 110a-c may also be used. For example, in a cellular system the user equipment may be a single device having internal modules. The display 112 may be the alphanumeric or graphical display of the cellular phone, the input device 114 is the dialing keypad, and the communication module 116 is the internal circuitry of the cellular phone. In other situations, the user equipment 110a-c may be a laptop, a PDA such as a handheld computer, a palm computer, an Internet appliance or any other device having the communications, processing and display capabilities for implementing various aspects of the present invention. As an example, the devices may use a display 112 that is a flat panel graphical display. The input device 114 may be a writing pen or a touch screen display, etc. In some embodiments the input device 114 may be a common QWERTY keyboard. The terms 'input device', 'keyboard', 'limited-space-keyboard' and 'keypad' may be used interchangeably throughout the application. Henceforth, the description of the present invention may use the term 'keypad' as a representative term for any of the above group. More information about the operation of user equipment 110a-c is disclosed below in conjunction with the descriptions of FIG. 2, and FIGS. 5a & 5b.

Communication channels 142 and 144 may carry data among other types of communication transportation, depending on the type of system 100. Usually the data transportation over 142 & 144 can be based on an IP protocol. Communication channels 142 and 144, may be combined or separated, and each one of such channels may take the form of plane communications, such as, but not limited to, telephone lines, coaxial cable, cable TV or fiber-optic cable, or may be wireless communication, such as, but not limited to, cellular communication, satellite digital TV, etc.

Along their communication path, channels 142 and 144 may change forms and may use any combination of the above mentioned communication channel types or techniques. The discloser of the present application refers to the communication channel 144 that carries the data from the service provider 120 to the user equipment 110a-c as the source channel. The communication channel 142 that carries data from the user equipment 110a-c is referred to as the back channel or the return channel. The terms back channel, return channel or return path may be used interchangeably throughout the application. The terms digital TV and interactive TV may be used interchangeably throughout the application.

In an exemplary embodiment particularly well suited for use within a cable digital TV network, both the source channel 142 and the return channel 144 and the TV broadcasting signals may be transferred by single cable coupled to a cable modem. In another embodiment, the television broadcasts and an Internet connection over the source channel 144 may be provided by a satellite communication path, while the back channel 142 may be provided by another communication channel such as a telephone connection.

Service Provider Premises (SPP) 120 may be a digital TV operator, a cellular operator, an Internet service provider, etc. In some embodiments, SPP 120 may be a thesaurus service provider who offers downloading services of updated thesauri sorted according to their topics. SPP 120 may download thesauri upon receiving a request from a user. SPP 120 may comprise the following relevant elements: a receiver (RX) 122, a transmitter (TX) 126, a text message server (TMS) 124, a database 132, a statistical processor (SP) 134, and a bank of thesauri (BOT) 136. Each of these various elements may be one or more servers sharing the same application and load or a software application that is installed in a server with other applications. The forms of those elements depend on the volume of transportation via the SPP 120. For example, the database 132, statistical processor (SP) 134 and the bank of thesauri (BOT) 136 may reside in the TMS 124. All the elements may be connected over a Local Area Network (LAN) (not shown) or any other type of network.

Transmitter 126 may transmit the common information that is delivered by the service provider 120 with text messages to users 110a-c. In a digital TV premise, the transmitter 126 may be a satellite transmitter or a cable transmitter, depending on the communication network that is used. In a cellular operator's premise, the TX 126 may transmit the common cellular communication with text messages.

RX 122 is used to receive the back channel carrying the text messages from the user equipment 110a-c. In a satellite digital TV premise, the RX 122 may be an Internet access module that is connected to the Internet via a common connection.

For a cable TV premise, RX 122 may be a cable modem that is adapted to accept Internet Protocol data communication, for example. In a cellular service provider's premise, the RX 122 may receive common cellular communication with text messages. In an Internet service provider premise, RX 122 and TX 126 may be the common means that are used for receiving and transmitting IP based communication between one or more users 110*a-c* and the IP operator.

TMS 124 may be a gateway for text communication between user equipment 110*a-c*. TMS 124 may also be used as a gateway between the service provider network (TV, cellular, etc.) and the external network 150. In addition, TMS 124 may have other text applications; for example, it may support chat rooms, forums, text advertising, etc. In addition to its common operation, TMS 124 may be modified to forward text messages that are transferred via TMS 124 to database 132. TMS 124 may forward all the messages or selected portions of the transportation. Forwarding the text messages may be done according to the topic of the message. The topic may be defined by the chat room or the forum, or it may be defined by the user while creating the message. In some exemplary embodiments, the topic can be detected and classified by TMS 124 based on the content, the address, etc. In other embodiments, one or more users may have a personal thesaurus managed by the SPP 120.

In some exemplary embodiments, database 132 may receive input from additional sources, such as, but not limited to, another database that may contain a thesaurus of words that are frequently used in text messages or from another topic that is close to the topic of the database; in some cases, words may be added manually by the service provider, etc. In some embodiments, a user may provide his own thesaurus to the service provider. The service provider may add it to the appropriate database and/or to the appropriate thesaurus.

Database 132 may be divided into a plurality of DB sections. Each DB section may be dedicated to a topic. Each entry in the database may have a time stamp that indicates its time of receipt. The database may be configured to delete the oldest messages when necessary. The information from database 132 is retrieved by SP 134.

SP 134 may read a section of the database and statistically process it in order to generate an updated thesaurus for the topic that is associated with the retrieved DB section. Each thesaurus may be organized in a hierarchical structure. The first level may be associated with the first character of an entered word. The first level of each thesaurus may have an entry for each possible character. The second level may have an entry for each combination of the first character with a second character, etc.

Each entry in the thesaurus may have a list of suggested word or term completions that may complete the data entry. Each list may include one or more items, for example the number of items may be in the range of one to ten or more items, and each entry may have a different number of items. The number of items may be varied from one to several items, such as, but not limited to, three, five or seven words. The completion suggestions are positioned in the list based on a computed indication of the likelihood of being the selected completion. The indication of likelihood of being selected may be a function of the number of appearances in the DB section and the time stamp of each appearance, number of different users that uses the term, etc. Newer information may have a higher score than older information. The updated topic thesaurus then is transferred to the BOT 136, and the SP 134 starts updating the next topic thesaurus. The operation of SP 134 is disclosed in greater detail below in conjunction with the description of FIG. 4.

Another embodiment of the present invention may give a score to each one of the words in the database. The score may be based on a combination of different criteria, such as, but not limited to, the number of appearances of the word in the database, the number of different users that utilize the word, or when the word was added to the database. Then a filter may be used for removing certain types of words. For example, a filter that removes dirty words, sexual words, curse words, etc. Such a filter may not be used for a thesaurus that is used in sexual chat, for example.

BOT 136 may comprise one or more thesauri, each one being dedicated to a topic. The thesauri may be updated and reflect the status of the data within the database at the time of the last update. Each thesaurus may be based on a collection of data from a plurality of users. When necessary, TMS 124 may retrieve the appropriate thesaurus from the BOT 136 and send it to the appropriate users.

Figure 2:
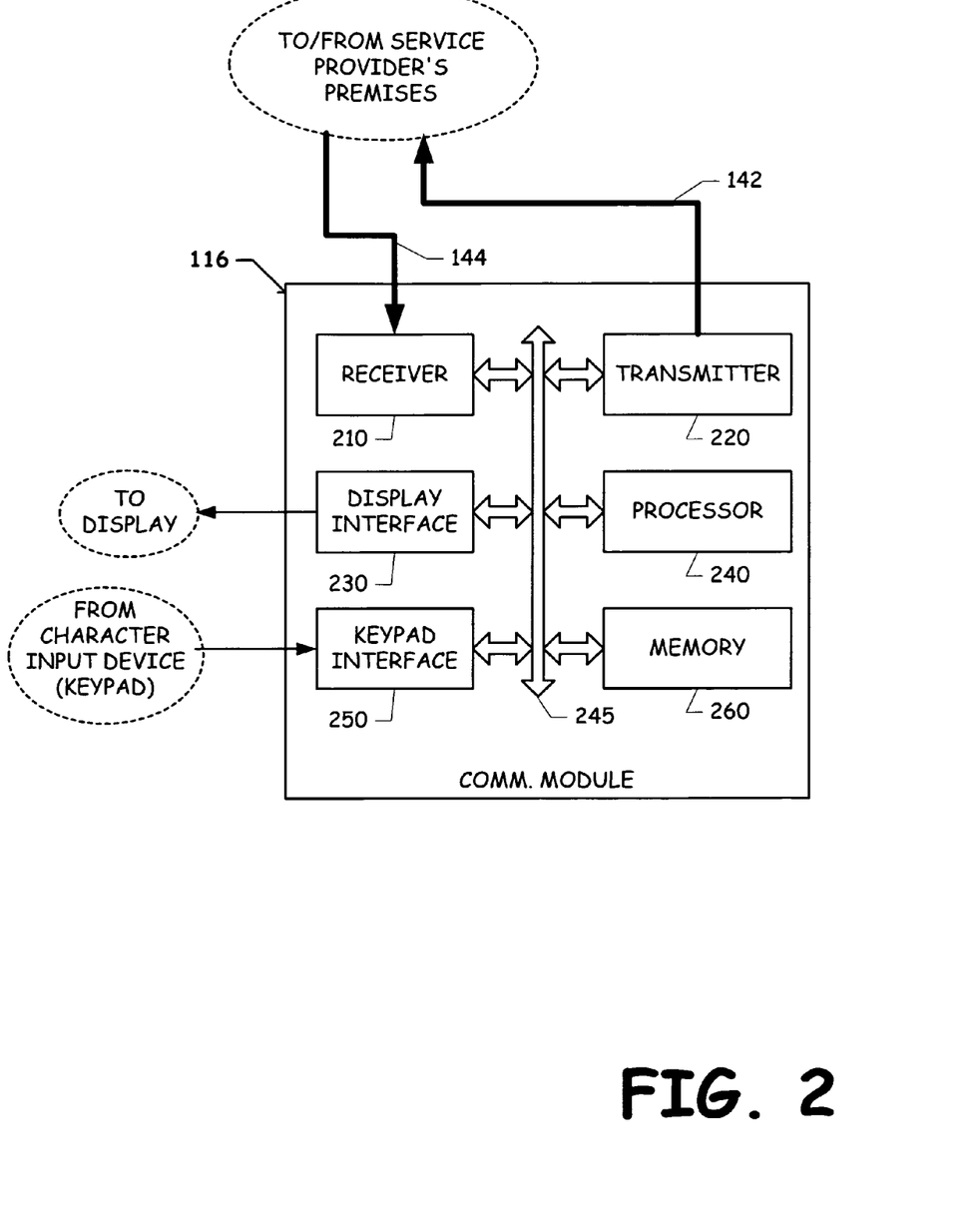
FIG. 2 illustrates a block diagram of a communication module in the user equipment that uses an exemplary embodiment of the present invention for accelerating text entry.

FIG. 2 illustrates a block diagram with the relevant elements of a communication module (CM) 116 that uses an exemplary embodiment of the present invention in order to accelerate text entry for an exemplary user equipment 110*a-c*. CM 116 may comprise a receiver 210, a transmitter 220, a display interface 230, a processor 240, a keypad interface 250 and a memory 260. Memory 260 may be a non-volatile memory. The internal elements of CM 116 may communicate over bus 245. Bus 245 may be a TDM bus, ATM bus, IP based bus, etc. CM 116 may have audio capabilities (not shown in the drawings), such as audio decoder and encoder to communicate with the user.

For an interactive TV application, CM 116 may be a set-top box or some other means for processing and transmitting digital TV communications. Display 112 (FIG. 1) may be a TV set and the keypad 114 (FIG. 1) may be the remote controller of the set-top box 116. Receiver 210 may be a tuner that is tuned to receive broadcast television video, to remove a television carrier signal, and to decode the audio/video/data signals. The decoded audio/video/data streams are transferred to the digital processor 240. Processor 240 may manipulate the signals (add text, graphics, animation, etc.) and send the manipulated signals via the display interface 230 to the TV 112 (FIG. 1). Digital processor 240 may execute a type of communication software that can access the SPP 120 via a transmitter 220. Transmitter 220 may be a cable modem for a cable TV or a common telephone modem for a satellite TV. The user interacts with the set-top box via remote controller 114 (FIG. 1). Usually remote controller 114 communicates with the set-top box 116 via infrared (IR) transmissions. Therefore, the keypad interface 250 is an infrared receiver for receiving the IR transmissions from the remote control unit 114 (FIG. 1). In another exemplary embodiment of the present invention, the keypad interface 250 may also be used for interfacing with a QWERTY keyboard and/or a pointing device such as a mouse.

In a cellular communication embodiment, the user's equipment may be a cellular telephone with textual communication capabilities, a handheld computer having a cellular modem, or a similar device. Receiver 210 and transmitter 220 may be the common TX/RX of the cellular phone. Keypad interface 250 and display interface 230 are provided for coupling input keys 114 (FIG. 1) and display (a video or alphanumeric) 112, respectively, with processor 240.

Memory 260 provides storage for the software applications that can be executed by processor 240, as well as storage for temporary data and the current thesaurus that may be used. In addition to the common applications that are stored in Memory 260, it may house a communication software program, such as a chat application, instant messaging, etc.; a keypad driver that may convert the keystrokes into characters for textual communication, or numbers depending on the current use of the keypad; and a software program and a current thesaurus that may accelerate entry of text according to an embodiment of the present invention.

Figure 3:
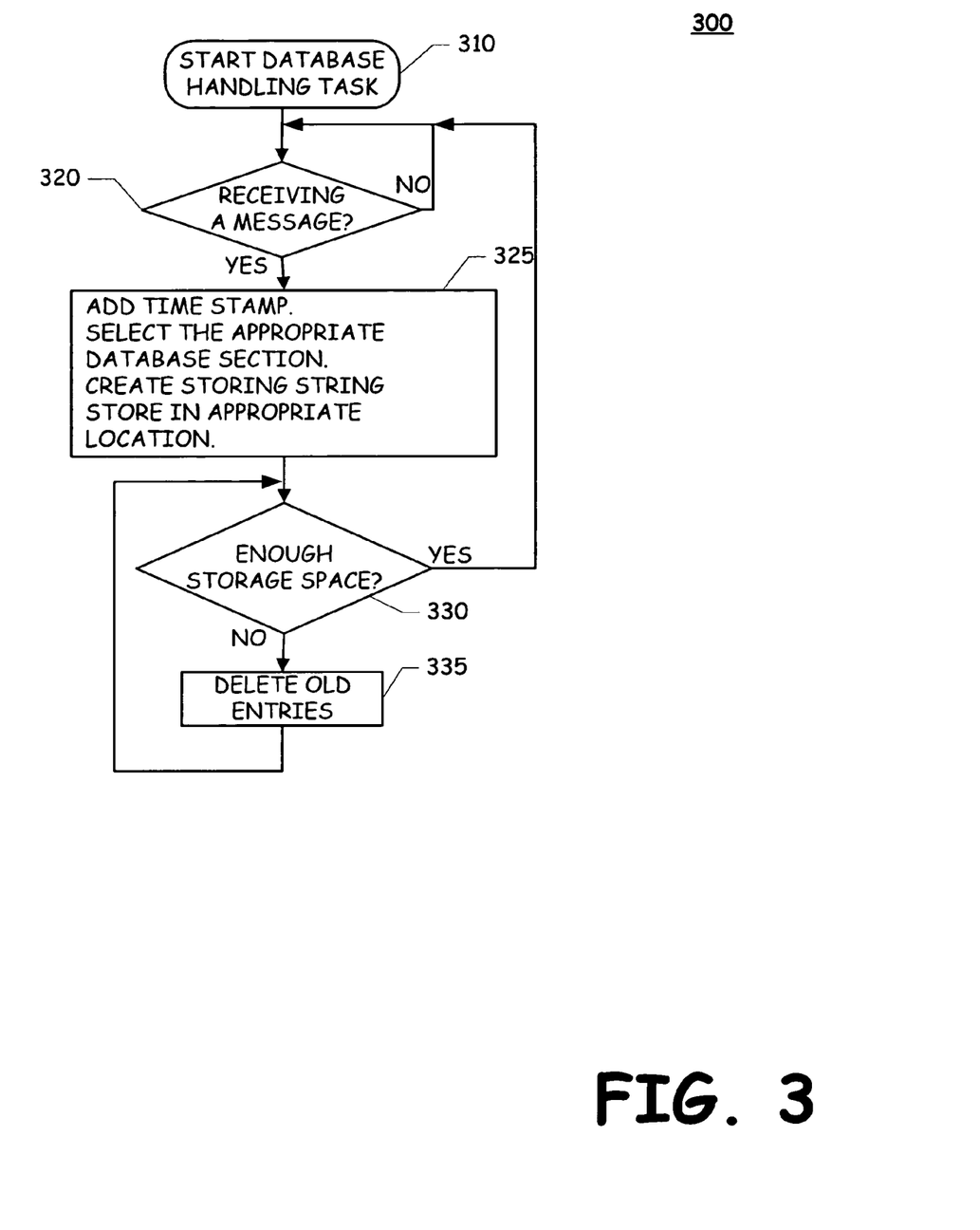
FIG. 3 is a flow diagram showing an exemplary method for handling one or more text message databases.

FIG. 3 illustrates a flowchart with the relevant steps of an exemplary method 300. Method 300 may be used for handling the database 132. Method 300 may be initiated at step 310 when database 132 (FIG. 1) is turned on and may run as long as the database is on or active. Method 300 may enter into a wait mode at step 320 anticipating the reception of a message from the TMS 124. Upon receiving the message 320, a time stamp is added to the message at step 325 and the appropriate section of the database is defined according to the topic with which the message is associated. Information about the topic may be received from the TMS 124 with the message. The message is then converted into one or more storing strings. The message may be divided into separate words, and each word may be stored as a string. In some cases, a combination of two or more words or symbols may be saved as a single storing string. For example, terms like "I love you", "Happy New Year", etc. that may be repeated in more than one message may be stored as a single storing string. Each storage string may receive the topic and the time stamp of the original message. Some words with one or two characters may not be kept as a storing string since there is no need to accelerate the tapping of short words. One or more strings may be stored 325 in the appropriate section of database 132.

At step 330 a decision may be made whether there is enough storage space available in the database 132. If there is enough storage space, the method 300 may return to step 320 and wait for the next message to be received. If there is not enough storage space, the method 300 may delete some of the older strings, and then it may recheck 330 the storage space. Other embodiments of the present invention may use other criteria to delete files or strings. For example, when a topic is canceled (e.g. when a TV series is ended), the entire database section that is associated with that TV series may be removed.

The order in which the storing strings are organized in the database 132 may be set according to different criteria. For example, the order may be alphabetic, or may reflect the receiving time or the popularity of the storing string, etc.

Figure 4:
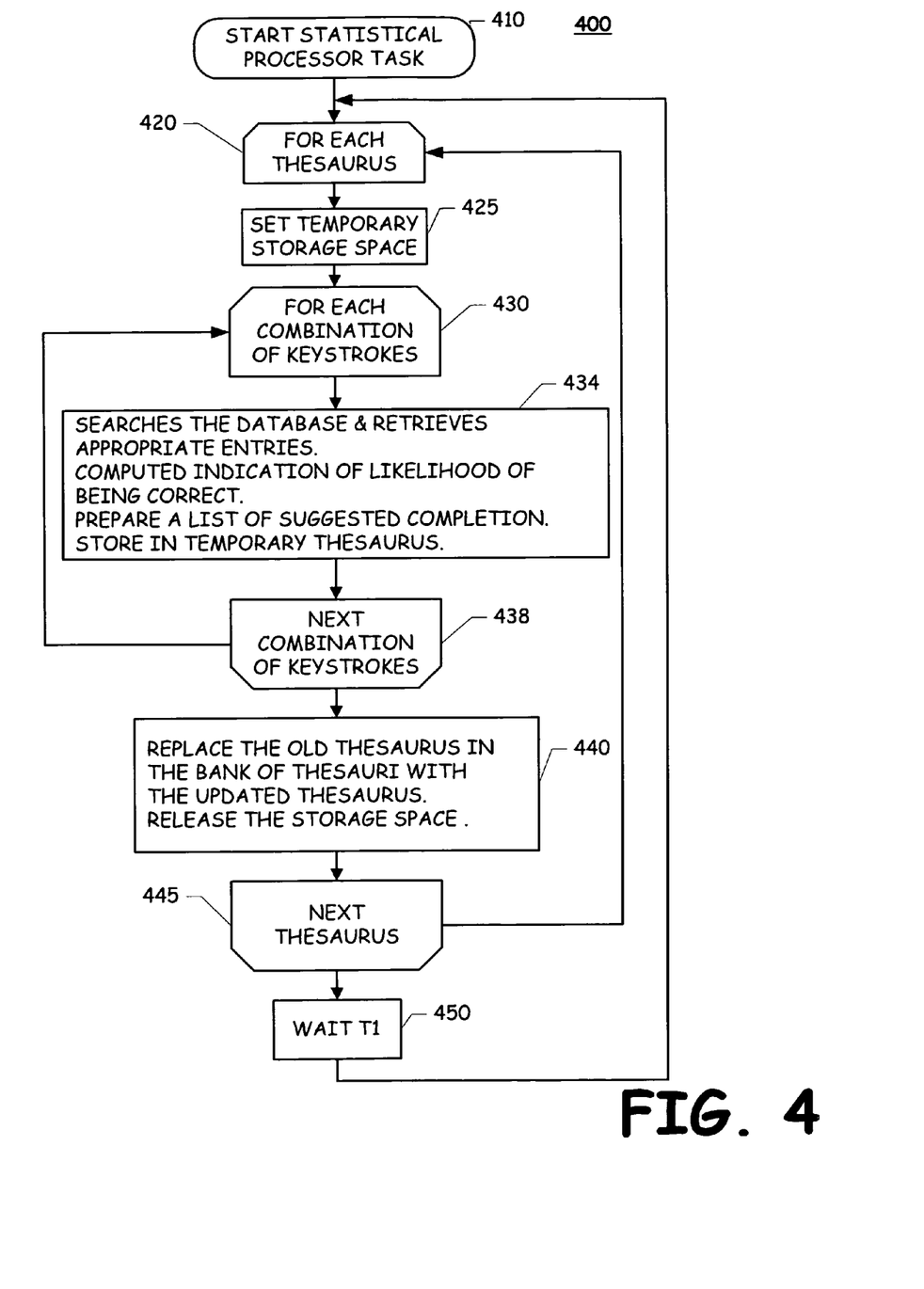
FIG. 4 is a flow diagram showing an exemplary method of operation of a statistical processor module.

FIG. 4 illustrates a flowchart with the relevant steps of an exemplary method 400. Method 400 may be used by a statistical processor (SP) 134 (FIG. 1) for creating and updating one or more thesauri in BOT 136. BOT 136 may include more than one thesaurus per topic. The different types of thesauri per topic may be defined by the user's equipment type. The user's equipment may define the length of the thesaurus. The method 400 may be initiated at step 410 when the SP 134 is turned on and may run as long as the SP 134 is on. The method 400 may start a loop over the different thesauri in the BOT 136. The loop starts at step 420 and ends at step 445. At step 425 a temporary storage place is defined for the current thesaurus.

The SP 134 then may start processing the appropriate section of the database in order to create an updated thesaurus. Several methods may be used in processing the database. For example, a loop over all possible combinations of keystrokes may be initiated. The loop starts from step 430 and ends at step 438. For each combination of keystrokes, the appropriate section of the database is searched for the storing strings that start with the current combination of characters. The combination may be of characters and numbers. Each combination may have a single character or number, two characters, three characters, etc.

Then the section of the database is searched at step 434 for storing strings that match the current combination. Each one of the matched strings is retrieved, and an indication of the likelihood of being selected is calculated for each retrieved string. An exemplary method for calculating the indication may be the sum of the product of the number of appearances of the storing string by a factor that indicates the time stamp. The factor is higher when the time stamp is closer. For example, the factor may be one (1) for a time stamp from this week or may be the value of 0.5 if the time stamp is earlier than this week. Another exemplary factor that may be used in addition to or instead of the time stamp is the number of different people that have used the term. A list then is prepared with one or more suggested completions. The number of suggested completions is dependent upon the number of matched strings that were found and the size limitation of the thesaurus that is currently in process. Based on this limitation, the found matched strings with the highest indication of likelihood of being selected are added to the list. The list is stored in the temporary storage space in the entry that reflects the current combination of keystrokes. Calculating the indication of likelihood of being selected may take into consideration some filters and may remove terms with higher scores because of the filter. For example, the filter may remove dirty words, sexual word, curse words, short words, etc. The actuation of the filter may be dependent on the topic of the thesaurus.

At step 438 a decision is made whether the current combination of keystrokes is the last one. If it is, then the loop is terminated, and method 400 continues to step 440. If there are more combinations, then the next combination of keystrokes is selected and the method 400 returns to step 430.

After searching all the options of combinations of keystrokes, the temporary storage space contains the full updated thesaurus. Therefore the relevant old thesaurus in BTO 136 (FIG. 1) is replaced 440 by the updated thesaurus and the temporary storage place is released. Then a decision is made at step 445 whether the current thesaurus is the last one. If it is, then the loop is terminated and method 400 continues to step 450. If there are more thesauri, then the next thesaurus is selected and the method 400 returns to step 420.

Before starting a new cycle of updating the thesauri in BOT 136 (FIG. 1), the method 400 may wait at step 450 for a certain period, T1. T1 may be defined according to different criteria or a combination of those criteria. For example, T1 may be a certain period of time (e.g. a day, a week, a month, etc.). T1 may reflect a quantity of new messages that have been received in the database in the period from the last update. In some cases T1 may be interrupted by a request from a user to receive an update thesaurus. After waiting 450, the method 400 may return to step 420 and a new cycle of updating the thesauri at the BOT 136 starts again.

Other methods for selecting the appropriate words from the database to create a thesaurus may be used by exemplary embodiments of the present invention. For example, the size of the thesaurus may be defined according to the user's equipment. Then SP 134 (FIG. 1) may copy the appropriate section of the database to the temporary storage space, organizing the storing strings in the temporary storage according to their frequency of appearance, selecting the most frequent strings that can fit the required size of the thesaurus and deleting the rest. The frequent strings may be organized according to the different possibilities of keystrokes. For each possible combination of keystrokes, a list of suggested completions is prepared forming the updated thesaurus. Then the updated thesaurus may replace the old one in the BOT 136 (FIG. 1). Other embodiments of the present invention may use other methods to create and update the thesauri. In other exemplary embodiments of the present invention, SPP 120 may not create and manage the list of suggested completions for each entry. The user's equipment may create and manage the list of suggested completions after each keystroke during the tapping of the message. The thesauri may include the most popular words or terms as disclosed in the next paragraph. Each entry in the thesaurus may have a suggested completion and a score that is associated with the entry. The score may be based on a combination of different criteria, such as, but not limited to, the number of appearances of the term in the database, the number of different users that utilize the term, the time stamp that indicates when the term was added to the database, etc.

In such an embodiment, SP 134 (FIG. 1) may copy the appropriate section of the database to a temporary storage space, organize the storing strings in the temporary storage according to their frequency of appearance, selecting the most frequent strings that can fit the required size of the thesaurus and deleting the rest. The frequent strings may be organized according to the different possibilities of keystrokes and may be transferred to the BOT waiting to be sent to the user's equipment. The agent in the user's equipment that operates according to this exemplary embodiment may execute, among other tasks, a task for creating a list of suggested completions for each keystroke.

An exemplary task in the user's equipment may search the thesaurus for all the strings that match a search string, wherein the search string reflects the last combination of keystrokes entered by a user of the equipment or by a process running on the equipment. Then the agent may select one or more words to form the list of suggested completions. The terms in the list may be organized according to their score from the highest score to the lowest score. The number of options in the list may be configured (a reasonable number can be in the range of few terms, such as, but not limited to, 3, 5, 10, etc.) and then the list may be displayed to the user.

Figure 5A:
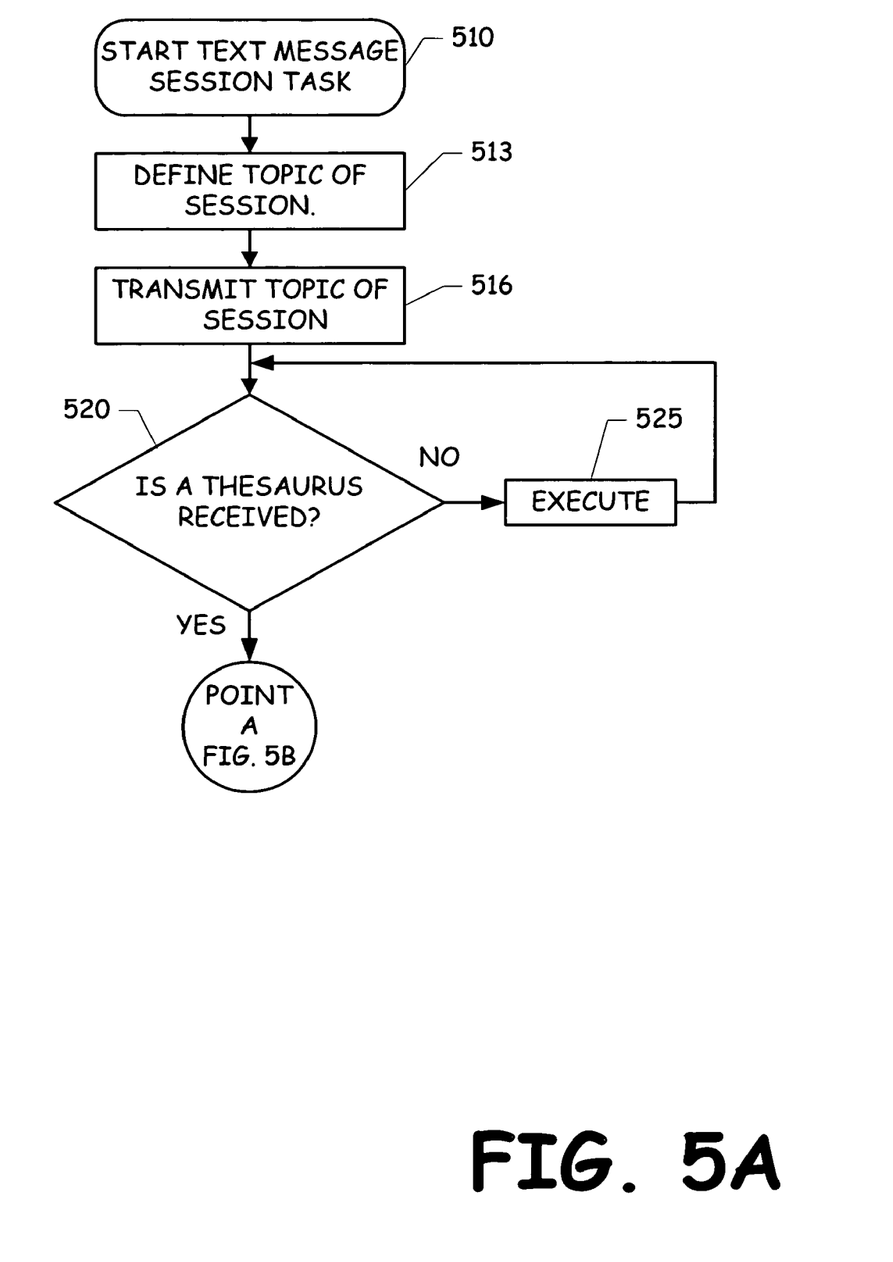
FIGS. 5a & 5b is a flow diagram showing an exemplary method for accelerating text entry.
Figure 5B:
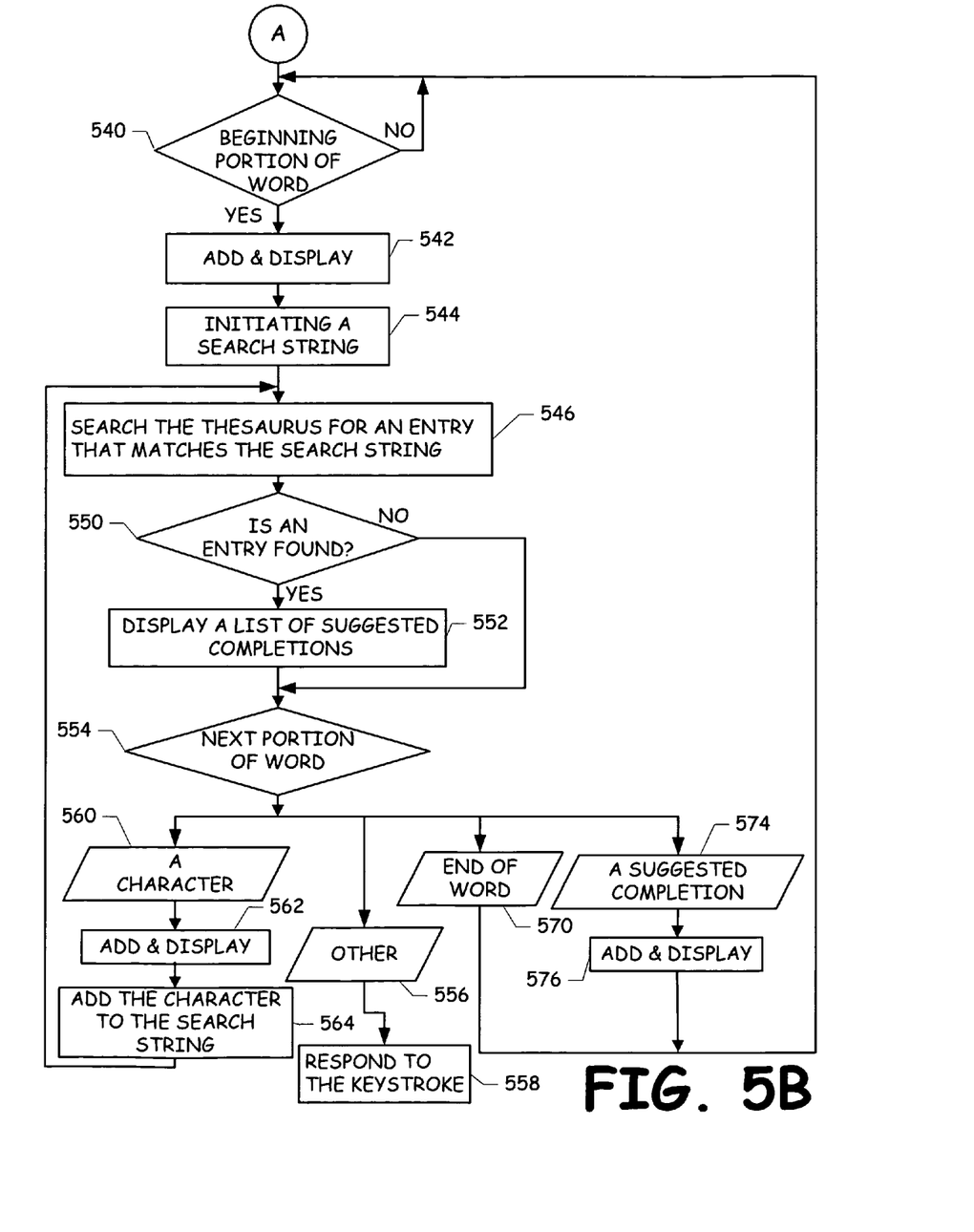

FIGS. 5*a* and 5*b* illustrate a flowchart with the relevant steps of an exemplary method 500. The method 500 may be used by system 100 (FIG. 1) during a text message session for accelerating the creation of the text message. The method 500 may be invoked (step 510) while starting a text message session. At the beginning of the session, the topic of the session may be defined 513. The topic may be defined in several manners. For instance, if the session is tied to a chat room, the topic may be defined from the address of the chat room. If the session is tied to an instant message session, the method 500 may prompt the user to define the topic. If a topic is not defined, a general topic may be used. The general topic may use a general thesaurus that may be constructed from the words that are most frequently stored in the entire database 132. This thesaurus may reflect a general message and may offer an appropriate list of suggested completions. In addition to the topic and the size of the thesaurus, a user may request the TMS 124 to avoid transferring the user's messages to database 132. At step 516 the topic of the session and the requested size of thesaurus may be transmitted to SPP 120. The size of the thesaurus may be defined by the user's equipment type 110 (FIG. 1).

At step 520, for each received input (e.g. a keystroke) from input device 114 (FIG. 1) a decision is made regarding whether or not a thesaurus has been received. If a thesaurus has not been received, the input is executed 525 according to the common operation of the user device.

If at step 520 a thesaurus is received, then the method 500 continues at step 530 (point 'A' in FIG. 5*b*). The thesaurus may be transmitted from SPP 120 to the user's equipment using a variety of different methods. The actual method utilized depends on the type of the network between the user's equipment 110 and the SPP 120 (FIG. 1). For example, in an interactive TV network, a carousel transmitting method for broadcasting the plurality of thesauri is used. The agent in the user's equipment may listen to the carousel broadcasting and wait for the appropriate thesaurus. Upon receiving the appropriate thesaurus, the agent stores it.

Within a cellular network, the thesaurus may be sent privately to the user's equipment over the cellular connection 144 (FIG. 1). The thesaurus may be sent in response to the user's request 516 for a thesaurus that fits the topic of the session.

Upon receiving a keystroke a decision is made as to whether the input is constitutes the beginning portion of a word or a term 530. If it is not a beginning of a word or term, then the input is executed according to the common operation of the user device 535 and method 500 returns to step 530 waiting for the next keystroke. If the input is a beginning of a word or term, then the input, which may constitute an input such as a character associated with a keystroke, is added to a current message string or may initiate a new message string, and the character is displayed 542. At step 544, a search string is then set reflecting the new input.

A search engine is initiated at step 546, and the search engine searches the thesaurus for an entry that matches the search string. If an entry that matches the search string has been found (step 550), then at step 552 the list of suggested completions that is stored for that entry is displayed. The list can be displayed near the relevant keystroke, and the method 500 then waits at step 554 for the next keystroke or portion of the word to be entered. If at step 550 an entry in the thesaurus was not found, then the method 500 proceeds to step 554 where the method waits for the next input or word portion.

In another exemplary embodiment of a user's equipment, the search engine may search the thesaurus for all the strings that match the search string. Then the agent may select one or more terms from the entries that have been found to form the list of suggested completions. The terms in the list may be organized according to various conditions, such as based on their score: from the highest score to the lowest score. The number of words in the list may be configured (a reasonable number can be in the range of few terms, such as, but not limited to, 3, 5, 10, etc.) and then displayed to the user.

Upon receiving the next keystroke at step 554, the type of the keystroke is analyzed. If the keystroke is a character or a number 560, then the character of the keystroke is added to the current string at step 562 and is displayed over display 112 (FIG. 1). The new character is also added to the old search string at step 564 and the new search string reflects the combination of the characters that have been typed. The method 500 returns to step 546 with the combined string and the search engine begins a new search on the combined search string.

If the keystroke indicates the end of word 570 (e.g. comma, full-stop, space, etc.), then the keystroke is added to the string of the message and is displayed. The method 500 then returns to step 530, waiting for the beginning of a new word or term to be tapped or entered.

If the keystroke is any other command 556, such as send, move up, move down, etc., then the method 500 responds at step 558 to the keystroke and follows the user's instructions. For some of the keystrokes, at the end of responding to the keystroke, the method 500 may return to step 520 or 530. For other keystrokes, the method 500 may be terminated after responding to the keystroke. In some cases the method 500 may return to step 554 and wait for the next keystroke. For example, if a suggested list is displayed and the keystroke is moved up or down, then the agent may respond by moving the cursor accordingly. The method 500 then may return to step 554, waiting for the next keystroke.

If the keystroke 574 indicates that one of the suggested completions has been selected, (for example, tapping the '#' key in keypad 114 (FIG. 1) may indicate that the suggestion which is currently pointed to by the cursor is selected by the user), then the selected suggestion is added to the current message string, or the string is replaced, at step 576, and the completed string is displayed over display 112 (FIG. 1). The method 500 then returns to step 530 waiting for the beginning of a new word or term to be tapped or entered. In some cases, at the end of a suggested term, a space character may be added automatically.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method of preparing and managing one or more thesauri at a server, wherein the one or more thesauri are used for accelerating the creation of a text message via an input device by a user, the method comprising the steps of:
   a. receiving a first plurality of text messages over a first period of time, each of the first plurality of text messages being entered by at least one of a plurality of users engaged in a first message session related to a particular topic;
   b. storing each of the received first plurality of text messages in a database associated with the particular topic;
   c. analyzing the database to prepare a thesaurus, the thesaurus being comprised of at least a portion of the received first plurality of text messages that are stored in the database and is associated with the particular topic;
   d. detecting a communication device initiating a second message session related to the particular topic; and
   e. transmitting the thesaurus associated with the particular topic to the communication device.

2. The method of claim 1, further comprising the steps of:
   f. receiving a second plurality of text messages over a second period of time in a subsequent message session related to the particular topic;
   g. storing each of the received second plurality of text messages in the database;
   h. analyzing the database to update the thesaurus with one or more of the second plurality of text messages stored in the database; and
   i. transmitting the updated thesaurus to the communication device;
   whereby the previously transmitted thesaurus is replaced by the updated thesaurus.

3. The method of claim 2, wherein the step of preparing a thesaurus comprises creating a thesaurus based at least in part for each topic in the database.

4. The method of claim 3, wherein the received thesaurus request identifies an associated topic and the step of transmitting an updated thesaurus further comprises selecting a thesaurus based on the associated topic.

5. The method of claim 3, wherein the received thesaurus request identifies the user's equipment and the step of transmitting an updated thesaurus further comprises selecting a thesaurus based on the user's equipment.

6. The method of claim 1, wherein each of the first and second plurality of text messages is associated with at least one topic and each of the first and second plurality of text messages is indexed in the database according to the at least one topic.

7. The method of claim 6, wherein the message session occurs in an Internet based chat room and the topic is selected based on the address of the chat room.

8. The method of claim 6, wherein the message session occurs in an Internet based chat room and the topic is selected based on the content of the chat room.

9. The method of claim 6, wherein the user identifies the topic.

10. The method of claim 1, wherein the step of transmitting the thesaurus is based at least in part on the identity of the user.

11. The method of claim 1, wherein periodically, a subsequent thesaurus request is received and in response to the subsequent thesaurus request, an updated version of the thesaurus is transmitted.

12. The method of claim 1, wherein each entry in the thesaurus has a score.

13. The method of claim 12, wherein the score is based on at least one criterion selected from a group of criterion including: a quantified total of appearances of the entry data in the database, a quantified total of different users that utilize the entry data, and a time that the entry data was added to the database.

14. The method of claim 1, wherein the thesaurus is filtered.

15. The method of claim 14, wherein filtering the thesaurus is based on at least one criteria selected from a group comprises of: dirty words, sexual words, curse words and short words.

16. The method of claim 1, wherein the input device is selected from the group of input devices consisting of writing pens, touch screen displays, keyboards, keypads, mouse and voice recognition.

* * * * *